June 14, 1966
M. EICHLER
3,255,533
THICKNESS GAGE
Filed Dec. 30, 1963
2 Sheets-Sheet 1
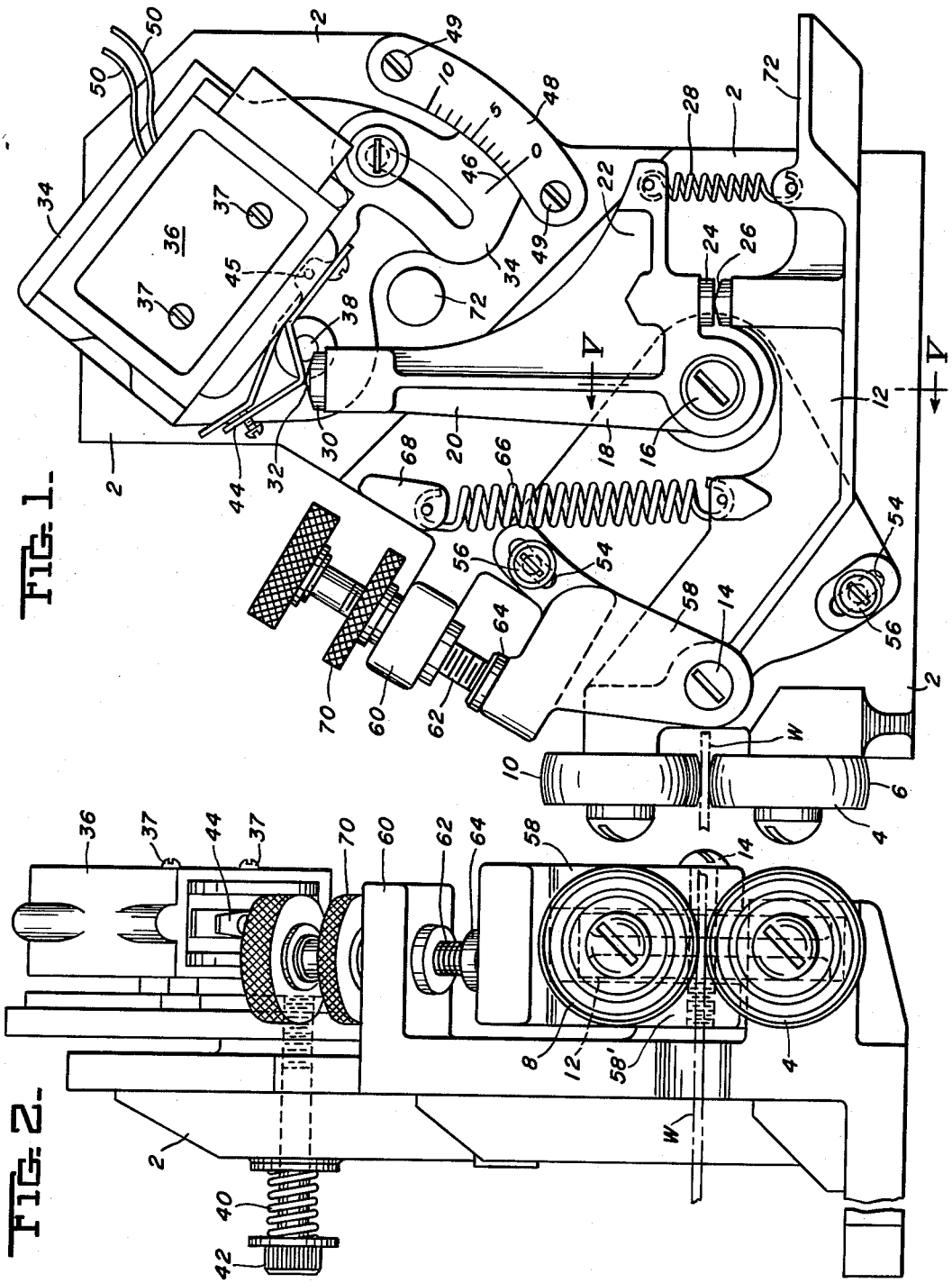
INVENTOR.
MARTIN EICHLER
By John W. Linkhauer
Agent June 14, 1966  M. EICHLER  3,255,533
THICKNESS GAGE
Filed Dec. 30, 1963
2 Sheets-Sheet 2
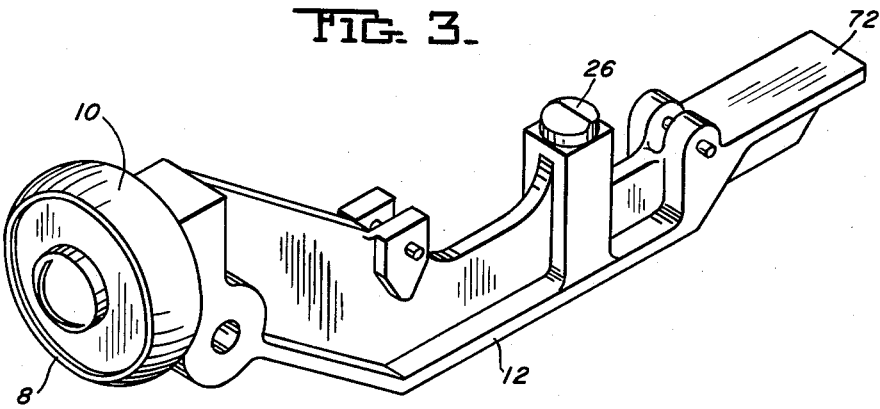
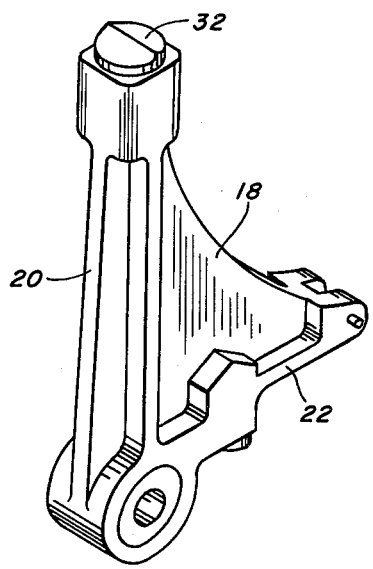
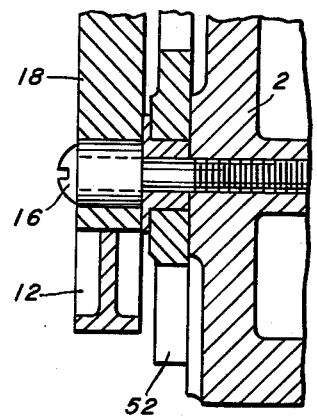
INVENTOR.
MARTIN EICHLER
By John W. Linkhauer
Agent United States Patent Office 3,255,533
Patented June 14, 1966

3,255,533
THICKNESS GAGE
Martin Eichler, 302 High St., Elizabeth Township, Allegheny County, Pa.
Filed Dec. 30, 1963, Ser. No. 334,213
20 Claims. (Cl. 33—148)

This invention relates to apparatus for measuring the thickness of material in the form of sheet, strip, or the like, and in particular, to a gage useful for measuring the thickness of metal, paper, and similar materials.

Other apparatus for the above-indicated purpose is known, but such other apparatus has a number of drawbacks or disadvantages that are overcome by the apparatus of my invention. Some gaging apparatus only gives an indication of the thickness of the work so that obtaining a rapid and dependable indication that the work has departed from the desired thickness by more than an allowable tolerance, or obtaining a rapid corrective action based upon such deviation from desired thickness, depends upon the attentiveness and the reaction time of a human operator. Accordingly, it is an object of my invention to provide apparatus that operates rapidly and automatically to indicate undesired departures from the desired thickness of the work and/or to take corrective action when they occur.

Other gaging apparatus, though provided with means for setting allowable tolerance limits and taking action automatically when the work departs from the limits set, are relatively difficult to adjust, requiring a number of resetting operations, even where only the desired thickness or only the desired tolerance is to be changed. Accordingly, it is a further object of my invention to provide a gage that can be rapidly and conveniently adjusted, with the adjustments for desired gage and desired tolerance being essentially independent of each other.

It is a further object of my invention to provide a gage that is sturdy, compact, light in weight, and simple in construction, so as to be useful in many applications and serve dependably, with a minimum of down-time for maintenance and repairs.

These and other objects of my invention will be apparent from the following description, taken together with the appended drawings, in which:

FIGURE 1 is a front elevation view of the apparatus of my invention;

FIGURE 2 is a left-side elevation view of the apparatus of my invention;

FIGURE 3 is an isometric view of a lever arm shown in FIGURE 1;

FIGURE 4 is an isometric view of another lever arm shown in FIGURE 1; and

FIGURE 5 is a sectional view, taken on the lines V—V in FIGURE 1.

As shown in the drawings, the gage of my invention comprises a frame member 2, upon which there is mounted a lower, fixed roller 4, preferably having its face convexly crowned as at 6, for a purpose to be explained more fully hereinafter. Cooperating with the roller 4 to grasp the work is a movable roller 8, also preferably having its face convexly crowned as at 10, mounted on a lever arm 12. The lever arm 12 is arranged to turn upon a pivot or fulcrum 14, the location of which is preferably adjustable in accordance with the desired thickness of the work to be gaged. The frame member 2 has a fixed pivot 16, and a second lever arm 18 is arranged to turn on pivot 16. Lever arm 18 is substantially L-shaped, having a long arm 20 and a short arm 22. Short arm 22 has, proximate to the pivot 16, a surface 24 bearing against a similar surface 26 on the distal portion of lever arm 12, and a spring 28 is provided to keep the surfaces 24, 26 in contact with each other. At the distal end of the long arm 20 of lever arm 18 there is provided a point member 30 having a V-shaped surface 32.

Also mounted on frame 2 is a mounting plate 34 for a switch 36 secured to the plate 34 by bolts 37. Mounting plate 34 can be turned about a pivot 38, and is preferably urged against the frame 2 by means of a spring 40 cooperating with a nut 42. The switch 36 has a V-shaped operating lever 44 movable about a pivot 45 and so arranged as to be in opposed point-to-point contact with the point of the V-shaped surface 32 of lever arm 18 when the work being gaged is at the desired gage. The lever 44 has a spring loading or other means operative to urge it toward a normal position in contact with the surface 32. The switch 36 is desirably of the type that, when the lever 44 is moved past a preselected location, the contact points of the switch are distinctly, definitely and rapidly opened or closed, to minimize arcing; such a switch is sold by Minneapolis-Honeywell Regulator Company of Freeport, Illinois, under the name "Micro-Switch." It is important that the pivot 38 be so located that, as the mounting plate 34 and switch 36 are turned about it, the point of the V-shaped operating lever 44 remains substantially in alignment with a preselected central position of the arm 20 and surface 32 corresponding to an indication of desired thickness of the work; and to this end, the pivot 38 is preferably located relatively close to, but not coincident with, the above-mentioned preselected central location of the surface 32. Mounting plate 34 also preferably has a pointer or scribe mark 46 cooperating with a scale 48 mounted on the frame 2 by means of bolts 49, to provide an indication of the tolerance by which the thickness of the work may depart from the thickness desired before the switch 36 will operate. Switch 36 is provided with output wires 50, which may form part of an automatic-control circuit, opening a normally closed relay or closing a normally open relay or energizing a suitable signal light, buzzer, horn, gong, or other warning device.

The means for adjusting the location of the movable pivot 14, in accordance with the desired thickness of the work, may be described as follows. A piece 52 is provided, mounted to turn about the pivot 16 and having slots 54 through which there are passed bolts 56, by means of which piece 52 is secured to the frame 2. Near the movable roller 8, the piece 52 takes the form of a block having legs 58 and 58' straddling the lever arm 12 and containing the pivot bolt 14, which passes through leg 58, through lever arm 12, and into the leg 58', wherein it is threadedly secured. Integral with or secured to the frame 2, there is a projection 60 having internal threading. An adjusting screw 62 passes through the projection 60 and bears against a boss 64 on the piece 52. A spring 66 connects a projection 68 on the frame 2 with the lever arm 12 and serves the dual purpose of urging together the rollers 4 and 8 and of urging the piece 52 against the screw 62 when an adjustment in the desired thickness of the work is being made. The screw 62 is preferably provided with a lock nut 70. The projection 68 also serves as a stop, to limit motion of the arm 20 to the left, just as a similar projection 72 serves to limit its motion to the right.

The apparatus described above operates in the following manner. When the gage is properly set for the desired thickness and desired tolerance, and the work W is engaged between the rollers 4 and 8, if the work W becomes somewhat thicker than desired, the lever arm 12 is turned clockwise about pivot 14. This moves the contacting point 26 downward, and because of the relative distances between the pivot 14, on the one hand, and the roller 8 and the point 26 on the other, the distance moved by the point 26 is substantially greater than and proportionate to the difference in the thickness of the work W. That is, there is a magnifying effect brought about by the lever arm 12. Similarly, when lever arm 12 turns about pivot 14 in a clockwise direction, as above-mentioned, lever arm 18 also turns clockwise upon pivot 16. This displaces the distal end of arm 20 to the right, also by a distance proportionate to the difference in the thickness of the work W, but still further magnified. It will be readily understood that if the thickness of the work had become somewhat thinner than that desired, the lever arms 12 and 18 would have moved correspondingly in the opposite direction, i.e., counterclockwise, and the end of the arm 20 would be moved to the left. That is, there is a preselected central position of the arm 20 that corresponds to having the thickness of the work equal to the thickness desired. When the arm 20 is at its preselected central position, clearly the arm 44 of the switch 36 is depressed inwardly as far as the arm 20 can depress it. Any motion of the arm 20, to either side, permits the arm 44 to move outward, and when it has done so to a certain extent, the switch 36 is activated, and a signal or indication or an automatic control action results.

The distance between the switch 36 and the arm 20 can be adjusted, and this provides for adjustment of the desired tolerance. If the switch 36 is moved closer to the arm 20, as by rotating the mounting plate counterclockwise by a small amount, then the arm 44 will initially, when the work W is at the desired thickness, be depressed inwardly by a relatively greater amount, so that a relatively greater sideways motion of the arm 20 is required in order to permit the arm 44 to move outward to the extent required to activate the switch 36. That is, rotating the switch assembly counterclockwise will increase the tolerance, or decrease the sensitivity, of the gage. Correspondingly, rotating the switch assembly clockwise has the opposite effect.

Adjustment of the desired thickness may, for example, be done in the following manner. With the desired tolerance having been set, the screws 56 are loosened, and a feeler gage or other piece of desired thickness is inserted between the rollers 4, 8. The screw 62 is then tightened (or, if necessary, loosened) to bring the point of the V-shaped surface 32 into opposed point-to-point contact with the point of arm 44 of switch 36. The lock nut 70 is then tightened, as are the screws 56. The feeler gage or other inserted piece may be conveniently removed and the work W inserted by pressing on the portion 72 of arm 12, to force the roller 8 away from the roller 4. It will be apparent to those skilled in the art how to provide other means for adjusting the location of the pivot 14 in accordance with the desired thickness of the work W and how to provide such means with a suitable scale, to permit adjustment to a desired gage without the use of a feeler gage or the like.

When gaging relatively heavy sheet metal, there is the possibility that if the gage as described above is rigidly mounted in one position, inaccurate readings will result. As the heavy sheet metal moves into the gage, it may tend to move up and down in a wavelike manner, and because of its rigidity, it may force the rollers 4 and 8 apart, so that one of them is no longer in contact with the work. To forestall this difficulty, it is desirable to mount the entire gage as described above between springs or in a vertical slide engaging the frame 2, to permit the gage to "float" with the moving work.

When the elements in contact with the work are rollers, it is essential that the movable roller be slightly crowned, and it is desirable that the other roller also be slightly crowned. The movable roller must be crowned, because if its face were flat, the gage would tend to give accurate results only when the work was at the desired thickness; as soon as the work departs from the thickness desired, only one edge or the other of a flat movable roller would remain in contact with the work. This is not only leads to inaccuracy in the gaging but also causes the roller to wear rapidly at the edges. Accordingly, in accordance with my invention, the movable roller is provided with a slight crown, such as to yield substantially equal angular movements of the lever arm 12 with corresponding equal differences in the thickness of the work. It is also desirable that the other roller be slightly crowned, because in actual operation of the gage the work tends to vary from the horizontal from time to time, and if the other roller is flat, the work tends to ride upon one edge or the other thereof and cause inaccurate gaging and undue wear, as mentioned above. Accordingly, it is preferred that the other roller also be slightly crowned, and that the amount of crown therein be taken into account in determining the amount of crown in the movable roller, as will be apparent to those skilled in the art.

Although I have shown and described herein one embodiment of my invention, I intend to cover as well any changes or modifications therein that may be made without departing from the spirit and scope of the invention.

I claim:
1. A gage comprising, in combination,
   means for contacting the work to be gaged,
   means responsive to said work-contacting means for moving an elongated member having a V-shaped end surface from and toward a preselected central position, according as the work differs from and returns to a preselected desired thickness, said means being so constructed and arranged as to provide movement of said V-shaped surface, relative to said preselected central position, proportionate to and substantially greater than deviations in the thickness of the work from said preselected thickness,
   and means for providing an indication when the work departs from said preselected thickness by more than a preselected tolerance, comprising a pivoted member with means to return said member to a normal position and a V-shaped surface, the point of which is substantially at said preselected central position and, when the work is at said desired thickness, is in opposed point-to-point contact with the point of said V-shaped end surface.

2. A gage as defined in claim 1, characterized in that said indication-providing means comprises, in addition, means for adjusting the location of said pivoted member relative to said V-shaped end surface, to adjust correspondingly said preselected tolerance.

3. A gage as defined in claim 1, characterized in that said indication-providing means comprises
   a switch having a pivoted spring-loaded member with a V-shaped surface, the point of which is substantially at said preselected central position and, when the work is at said desired thickness, is in opposed point-to-point contact with the point of said V-shaped end surface, and
   means for adjusting the distance between said switch and said member-moving means to adjust correspondingly said preselected tolerance.

4. A gage as defined in claim 3, characterized in that said distance-adjusting means comprises a mounting for moving said switch about a pivot, said pivot being so located that, as said switch is moved relative to said elongated member, the point of said V-shaped surface remains substantially at said preselected central position.

5. A gage as defined in claim 4, characterized in that said mounting is provided with means for securing it in a desired position and a scale for indicating said preselected tolerance.

6. A gage as defined in claim 1, characterized by said work-contacting means comprising rollers in contact with said work, at least one of said rollers having a face crowned convexly, and
   said member-moving means comprising a plurality of cooperating pivoted levers, the one of said levers most remote from said rollers having said V-shaped end surface at its distal end, said levers being so constructed and arranged as to provide movement of said V-shaped surface, relative to said preselected central position, proportionate to and substantially greater than deviations in the thickness of the work from said preselected thickness.

7. A gage as defined in claim 6, characterized in that said indication-providing means comprises a switch having a pivoted, spring-loaded member with a V-shaped surface, the point of which is substantially at said preselected central position and, when the work is at said desired thickness, is in opposed point-to-point contact with the point of said V-shaped end surface, and means for adjusting the distance between said switch and said member-moving means to adjust correspondingly said preselected tolerance.

8. A gage as defined in claim 7, characterized in that said distance-adjusting means comprises a mounting for moving said switch about a pivot, said pivot being so located that, as said switch is moved relative to said elongated member, the point of said V-shaped surface remains substantially at said preselected central position.

9. A gage as defined in claim 8, characterized in that said mounting is provided with means for securing it in a desired position and a scale for indicating said preselected tolerance.

10. A gage as defined in claim 6, characterized by one of said work-contacting rollers being fixed, the other of said work-contacting rollers being connected to a first lever arm movable about a first pivot, the face of said roller being crowned convexly in such manner that equal differences in the thickness of the work cause substantially equal angular movements of said lever arm about said first pivot, said gage also comprising means for adjusting the location of said first pivot in accordance with said preselected thickness.

11. Apparatus for gaging relatively thick sheet material comprising, in combination, a gage as defined in claim 10, and means for mounting said gage to permit it to move in a plane normal to that of the work passing therethrough.

12. A gage as defined in claim 10, characterized in that said means for adjusting the location of said first pivot comprises a block containing said first pivot and mounted to turn about a second pivot substantially farther from said rollers than said first pivot, a screw stop, and means urging said block against said screw stop.

13. A gage as defined in claim 12, characterized in that said indication-providing means comprises a switch having a pivoted, spring-loaded member with a V-shaped surface, the point of which is substantially at said preselected central position and, when the work is at said desired thickness, is in opposed point-to-point contact with the point of said V-shaped end surface, and means for adjusting the distance between said switch and said member-moving means to adjust correspondingly said preselected tolerance.

14. A gage as defined in claim 13, characterized in that said distance-adjusting means comprises a mounting for moving said switch about a pivot, said pivot being so located that, as said switch is moved relative to said elongated member, the point of said V-shaped surface remains substantially at said preselected central position.

15. A gage as defined in claim 14, characterized in that said mounting is provided with means for securing it in a desired position and a scale for indicating said preselected tolerance.

16. Apparatus for gaging relative thick sheet material comprising, in combination, a gage as defined in claim 15, and means for mounting said gage to permit it to move in a plane normal to that of the work passing therethrough.

17. A gage as defined in claim 12, in which both said block and a second lever arm are arranged to rotate about said second pivot, said second lever arm having said V-shaped end surface at its distal end and having at its proximate end a surface bearing against the distal end of said first lever arm.

18. Apparatus for gaging relatively thick sheet material comprising, in combination, a gage as defined in claim 17, and means for mounting said gage to permit it to move in a plane normal to that of the work passing therethrough.

19. A gage as defined in claim 17, characterized in that each of said rollers has a face crowned convexly in such manner that equal differences in the thickness of the work cause substantially equal angular movements of said first lever arm.

20. Apparatus for gaging relatively thick sheet material comprising, in combination, a gage as defined in claim 19, and means for mounting said gage to permit it to move in a plane normal to that of the work passing therethrough.

References Cited by the Examiner

UNITED STATES PATENTS

| | | | |
|---|---|---|---|
| 1,789,650 | 3/1931 | Berlowitz | 33—148 |
| 1,811,480 | 6/1931 | Stockwell et al. | 33—148 |
| 2,177,009 | 10/1939 | Terry et al. | 33—148 |
| 2,220,280 | 11/1940 | Richards | 33—148 |
| 2,376,372 | 5/1945 | Martinec | 33—148 |

ISAAC LISANN, *Primary Examiner.*

W. D. MARTIN, JR., *Assistant Examiner.*